United States Patent
Icenoggle

(10) Patent No.: US 7,756,797 B2
(45) Date of Patent: Jul. 13, 2010

(54) LEVERAGING USER-TO-USER INTERACTIONS IN A KNOWLEDGEBASE USING A FORUM INTERFACE

(75) Inventor: Radd Icenoggle, Bozeman, MT (US)

(73) Assignee: Rightnow Technologies, Inc., Bozeman, MT (US)

( * ) Notice: Subject to any disclaimer, the term of this patent is extended or adjusted under 35 U.S.C. 154(b) by 562 days.

(21) Appl. No.: 11/694,416

(22) Filed: Mar. 30, 2007

(65) Prior Publication Data

US 2008/0243729 A1      Oct. 2, 2008

(51) Int. Cl.
*G06F 15/18* (2006.01)
(52) U.S. Cl. ....................................................... 706/12
(58) Field of Classification Search .................. 706/12, 706/45; 707/2, 3, 5; 709/217
See application file for complete search history.

(56) References Cited

U.S. PATENT DOCUMENTS

| | | | |
|---|---|---|---|
| 6,434,550 B1 * | 8/2002 | Warner et al. .................... | 707/3 |
| 6,665,655 B1 * | 12/2003 | Warner et al. .................... | 707/2 |
| 6,842,748 B1 * | 1/2005 | Warner et al. .................... | 707/2 |
| 7,185,065 B1 * | 2/2007 | Holtzman et al. ............ | 709/217 |
| 2007/0226205 A1 * | 9/2007 | Carrer et al. .................... | 707/5 |
| 2008/0222100 A1 * | 9/2008 | Chiu ............................. | 707/3 |

OTHER PUBLICATIONS

CNET Message Boards, http://forums.cnet.com accessed Jul. 27, 2009, archived page from Dec. 15, 2001 available at http://web.archive.org/web/20011215043338/forums.cnet.zdnet.com/group/zd.Windows.Me/cnet/oview.tpt/@thread@first@F@150@D-,D@all?ROS=1 accessed Jul. 27, 2009.*
phpBB v.2.0, software product released Apr. 2002; release history discussed at: http://www.phpbb.com/about/history/ accessed Jul. 28, 2009; features discussed in Userguide, available at: http://www.phpbb.com/support/documentation/2.0/ accessed Jul. 28, 2009.*

* cited by examiner

*Primary Examiner*—Donald Sparks
*Assistant Examiner*—Vincent M Gonzales
(74) *Attorney, Agent, or Firm*—Husch Blackwell Sanders LLP

(57) ABSTRACT

Systems and methods provide a self-learning knowledgebase in which the ranking and/or order of topic and thread items may be dynamically and automatically adjusted based on self-learning by the knowledgebase. The knowledgebase includes threaded conversations comprising thread topics and thread items within the thread topics. Lists of thread topics and lists of thread items are ordered lists. The order of a thread topic or thread item in an ordered list may be modified based on self-learning activities performed by an information server maintaining the knowledge base. A thread topic or thread item may be moved higher in the list based on requests to view the thread topic or thread item. Further, the order that a thread item appears in an order list may be modified based on a number of responses posted for the thread item.

20 Claims, 12 Drawing Sheets

LEVERAGING USER-TO-USER INTERACTIONS IN A KNOWLEDGEBASE USING A FORUM INTERFACE

FIELD

This application relates generally to systems and methods providing a forum interface and, more particularly, to utilizing user-to-user interactions maintained in a knowledgebase to present information for the forum interface.

BACKGROUND

Electronic discussion rooms have existed in the electronic domain for quite some time. Historically they were called Bulletin Board Systems (or usually just BBSs). Following BBSs came internet news, and more recently forums have been introduced. Each implementation provides a variety of features, but all retain at their core the ability for some individual to start a conversation thread and others to contribute to that conversation. These forums provide a useful gathering point for informal topic-based discussions. They often suffer, though, from the fact that conversations can often meander given their distributed production sources. Allowing a large group to contribute to a conversation inevitably results in contributions by unqualified individuals, producing a sometimes very low signal to noise ratio. One approach to solving this problem resulted in the concept of a moderated forum, with one individual (or a small group) qualified to approve postings to the forum.

In contrast, knowledgebases are typically seeded using pieces of information that may be filtered through a knowledge engineer and there is typically little interaction with actual end-users of the knowledgebase. This means that the knowledgebase may be biased by the knowledge engineer's perspective, and the production of the content may create a comparatively heavy workload to the knowledge engineer as compared to the distributed production of content in a forum.

SUMMARY

Systems and methods maintain a knowledgebase having threaded conversations comprising thread topics and thread items within the thread topics. Lists of thread topics and lists of thread items are ordered lists. The order of a thread topic or thread item in an ordered list may be modified based on self-learning activities performed by an information server maintaining the knowledge base. A thread topic or thread item may be moved higher in the list based on requests to view the thread topic or thread item. Further, the order that a thread item appears in an ordered list may be modified based on a number of responses posted for the thread item.

These and other advantageous features of the various embodiments will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
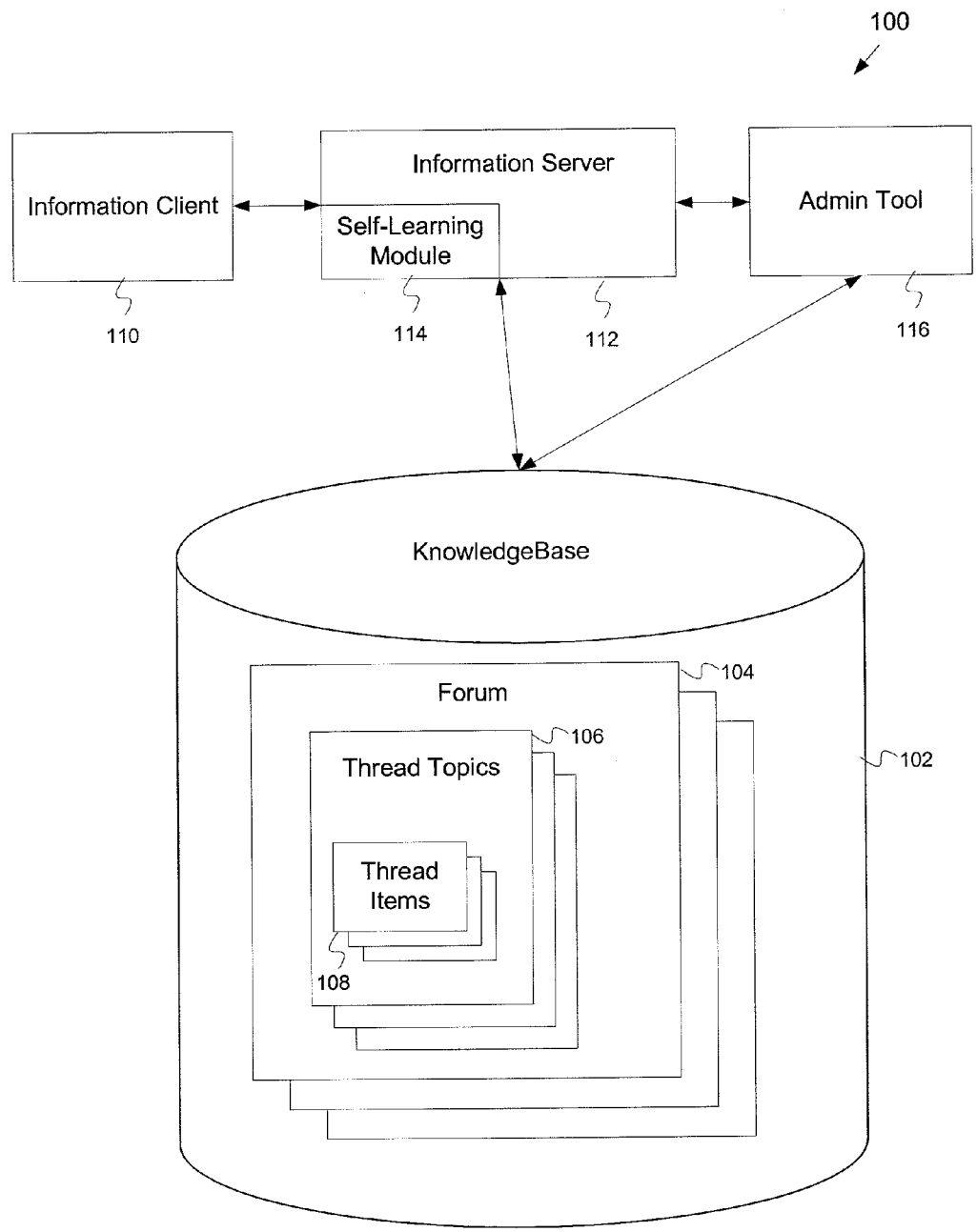
FIG. 1 is a top level diagram of a system architecture according to embodiments of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. Also, please note that the first digit(s) of the reference number for a given item or part of the invention should correspond to the FIG. number in which the item or part is first identified.

The description of the various embodiments is to be construed as exemplary only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a top level diagram of a system architecture 100 according to embodiments of the invention. Some embodiments of the invention include an information client 110 communicably coupled to an information server 112, which in turn is communicably coupled to a knowledgebase 102. Various mechanisms may be used to communicably couple information client 110 to information server 112 and information server 112 to knowledgebase 102. For example, a wired or wireless network may couple information server to knowledgebase 102. Alternatively, knowledgebase 102 may reside on the same system as information server 112, in which case various interprocess communications mechanisms may be used. Further, information client 110 may communicate with information server 112 over the Internet. The embodiments are not limited to any particular method of communicably coupling the various components.

In some embodiments, knowledgebase 102 maintains one or more forums 104. A forum 104 is a collection of threaded conversations between users that may have one or more thread topics 106. A thread topic 106 may have one or more thread items 108. In general, the level of specificity or detail increases from forum to thread topic to thread items. For instance, forums and thread topics 106 may be headings for lists, while the thread items 108 may include a heading and content. As an example, a forum may have a title related to pest control, while thread topics may have titles that include details regarding various mechanisms for pest control, and thread items may provide details on a particular mechanism. The embodiments of the invention are not limited to any particular forum, thread topics or thread items. Thread topics and thread items may be collectively referred to as forum components.

Knowledgebase 102 may be implemented using a relational database, a hierarchical database, an object oriented database or as a set of files in a file system, or combinations thereof.

Information client 110 makes requests to information server 112 and receives responses from information server 112. In some embodiments, information client 110 may be a World Wide Web browser, such as, for example INTERNET EXPLORER® browser, MOZILLA FIREFOX® browser, or NETSCAPE NAVIGATOR® browser. In alternative embodiments, information client 110 may be a non-web based graphical user interface to information server 112.

Information server may be any type of server capable of providing responses to information client 110. In some embodiments, information server 112 is a web server. In alternative embodiments, information server 112 may be a server designed to provide responses that are not necessarily compliant with World Wide Web protocols. In general, information server 112 provides an interface for information clients to browse one or more forums that include thread topics 106 and thread items 108 having content that is related to the thread topic.

Each query and response and the communications therein may be considered a separate piece of knowledge. In some embodiments, these discrete pieces of knowledge are related to one another in knowledgebase 102 by the use of numerical identification keys. In some embodiments, each thread item 108 is assigned an identifier, also referred to as an id. Each thread item also as a parent id field used to identify a "parent" item for the thread item. In some embodiments, the first thread item in a thread is the parent item and each subsequent item uses the id of the parent as its parent id. To illustrate, an example parent entry may have an id of 151 with no parent id (e.g. a value such as 0, or nil or other predefined value) and the subsequent threads attached to this parent item have their own unique id and a parent id of 151.

Self-learning module 114 is a component of information server 112 that is operable to automatically adjust the ranking or ordering of thread topics and thread items within thread topics. Module 114 is described as self-learning because it "learns" the importance or significance of a thread topic or thread item based on the requests received by information server 112 from information clients 110 and based on the age of thread items and thread topics in the knowledgebase 102. Self-learning module 114 may implement a number of features with respect to knowledgebase 102 that provide structure to the thread topics 106 and thread items 108. Examples of such implementations may be found in U.S. Pat. Nos. 6,434,550, 6,665,655 and 6,842,748, each of which are hereby incorporated herein by reference for all purposes. While the patents included above provide details for the types of self-learning features available in a knowledgebase, they do not limit the possible algorithms useful for self-learning. One of ordinary skill in the art can readily identify alternate techniques that would work in their stead and that are within the scope of the inventive subject matter.

Some embodiments include an administration tool 116. As noted above, self-learning automatically adjusts ranking or ordering for thread topics or thread items. Administration tool 116 may be used by a system operator to manually adjust rankings or orderings for thread topics and thread items. Further, administration tool 116 may be used to moderate (e.g. edit, approve etc.) contributions to thread topics.

The operation of the above described system will now be described. When displaying the list of parent threads, the knowledgebase 102 ranks the individual threads by their self-learned importance according to algorithms such as those described below and in the patents incorporated by reference above. For example, several older threads 106 may be less important to current events than a recent thread, so the recent thread will appear ahead of the older threads in an initial list. However, one old thread, such as an "introduction" thread, might prove most important of all and hence appear as the first thread in the list.

Similarly, when displaying an individual thread 106 consisting of parent and child items 108 (i.e., conversations), the knowledgebase 102 may rank each entry in the conversation by it's self-learned importance. Since forum threads often have a relatively high amount of noise from people contributing to the conversation with nothing to add, using the methods described below a self-learning module 114 can weight the particular entries people find useful ahead of entries consisting of noisy "me too," or "I agree" type items.

System 100 may maintain the data used to order or rank thread items in a variety of ways. For example, in some embodiments, data used to order or rank thread and thread items is stored in the same table as the thread id so that a database query can have the general form: SELECT data FROM table WHERE thread_id=X ORDER BY usefulness_rank DESCENDING. However, in alternative embodiments, the ranking data may be in a separate table sorted by thread id.

In addition, in some embodiments thread entries may be associated to an individual. Those individuals who have a highly weighted thread (or threads) can gain status in a system offering special recognition of higher status individuals. For example, only those users with a certain level of status gained from contributions that others have found useful may be given the permissions to create entirely new conversation threads (as opposed to simply responding to an existing thread, for example). Alternatively, high status could give someone the ability to moderate a forum, or offer them access to premium content or forums.

Further details on the operation of system 100 are provided below with reference to FIGS. 2-5.

Figure 2:
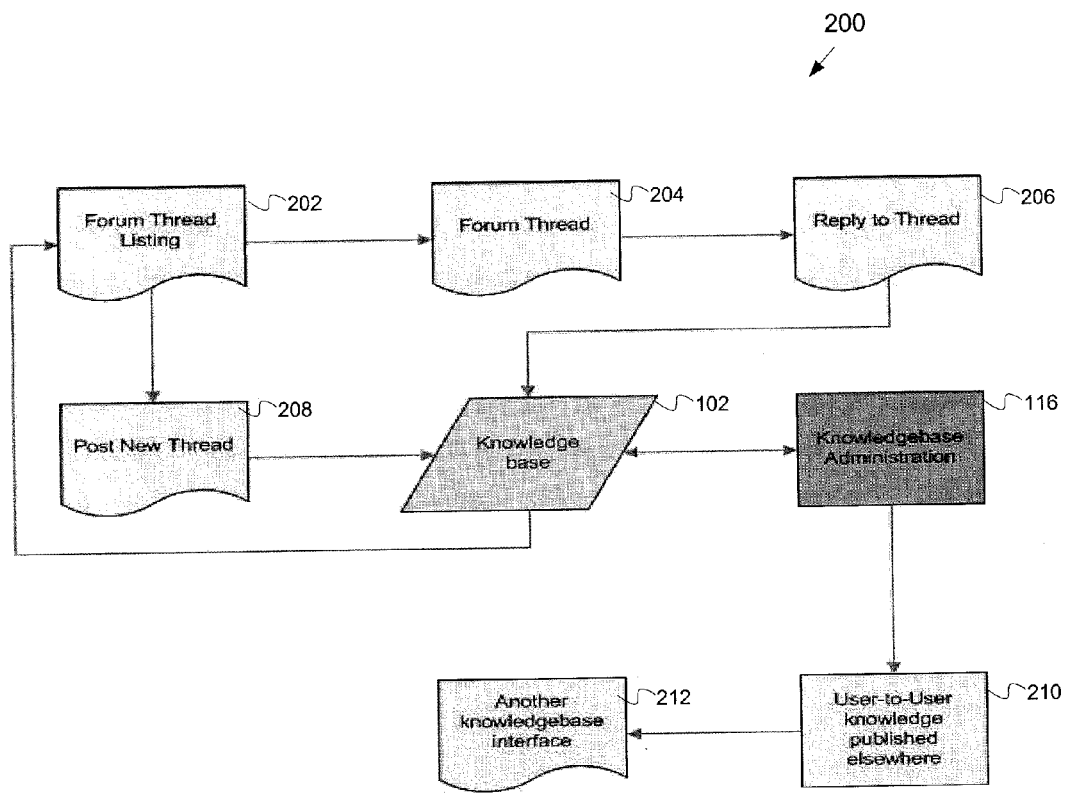
FIG. 2 is a flowchart illustrating a method for processing a forum according to embodiments of the invention.

FIG. 2 is a flowchart illustrating a method 200 for processing a forum according to embodiments of the invention. The method begins at block 202, where a system such as information server 112 provides a list of thread topics in a forum. The list of thread topics may be sent to information client 110. The topic listings are ordered based upon the self-learned ranking established in the knowledgebase 102 by self-learning module 114. As indicated above, the ranking may be based on learned indications of user interest.

Figure 6:
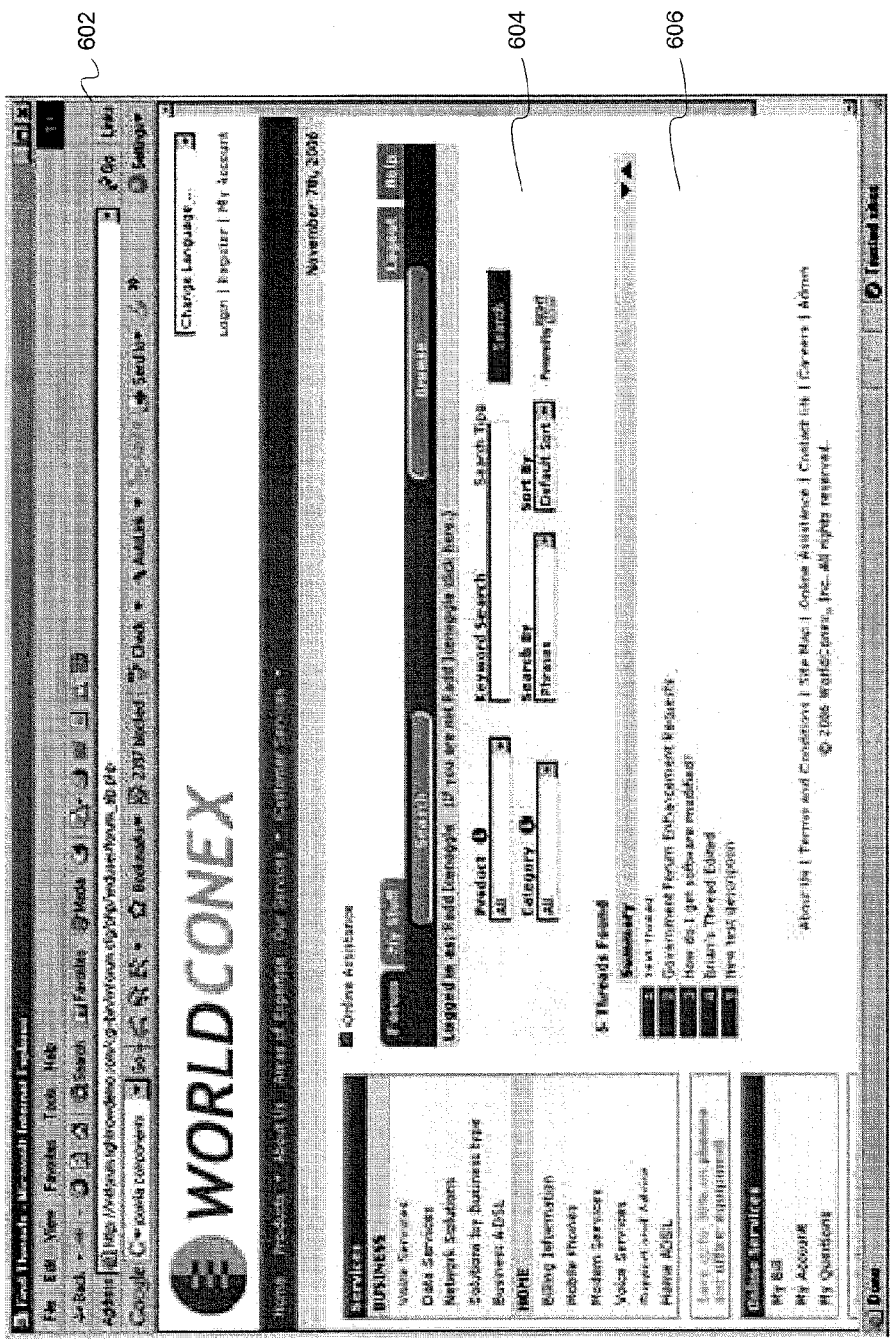
FIGS. 6-12 are example screen images according to embodiments of the invention.

An example screen of a topic listing in a forum is provided by example screen image 602 in FIG. 6. The example screen image 602 includes a search parameter area 604 for entering search parameters used to discover topics, and a topic listing area 606 that provides a list of available thread topics ordered as determined through the self-learning processes described herein.

Returning to FIG. 2, at block 204, a system such as information server 112 provides an ordered list of thread items after receiving a selection of a particular thread topic from those provided at block 202. The thread items may be ordered by the time the thread item was entered into the knowledgebase, or it may be ordered according to the self-learning process described herein.

Figure 7:
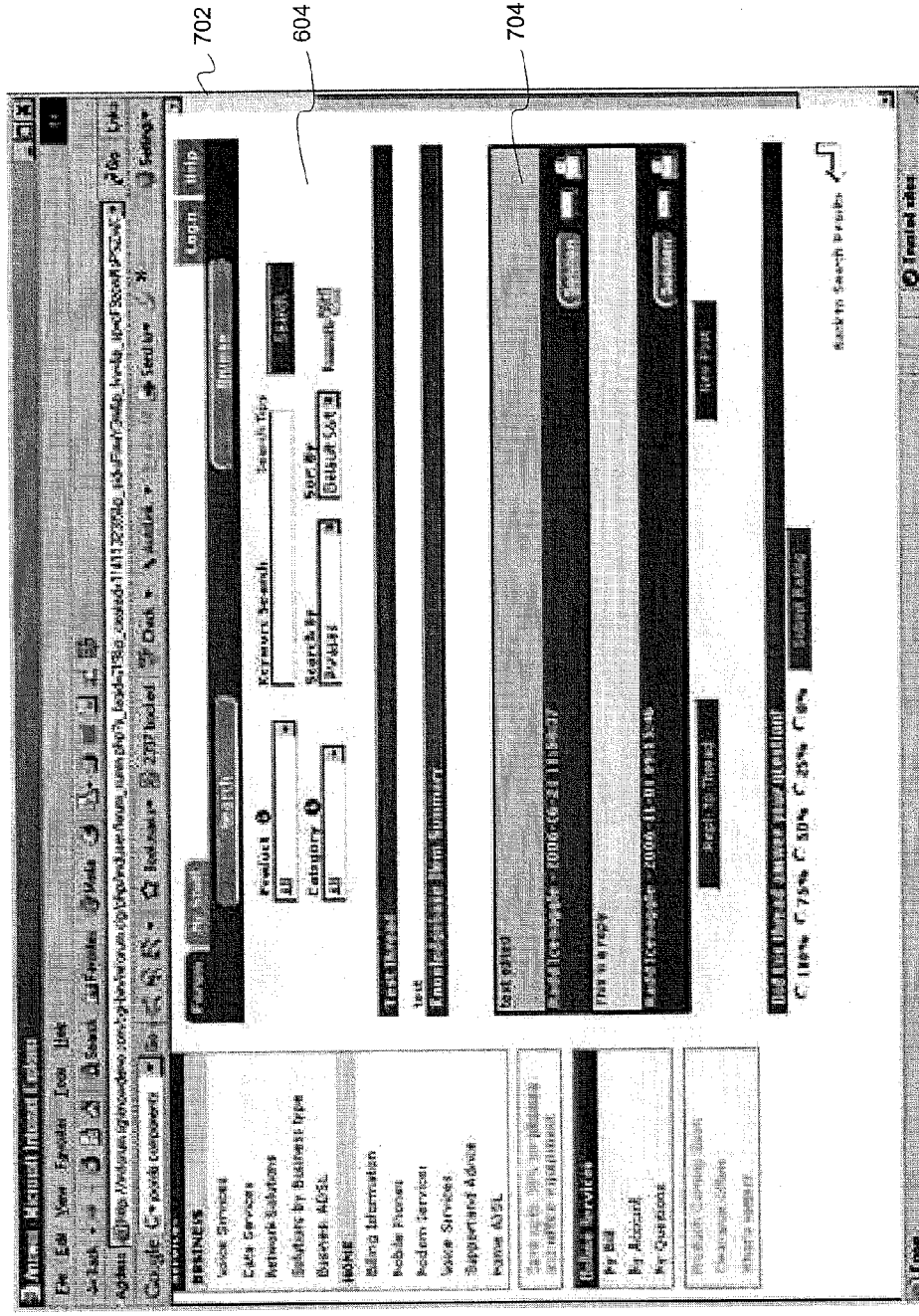

An example screen of a thread item listing for a thread topic is provided by example screen image 702 in FIG. 7. The example screen image 702 includes search parameter area 604. Thread item listing area 704 provides an ordered list of available thread items in a thread topic.

Figure 8:
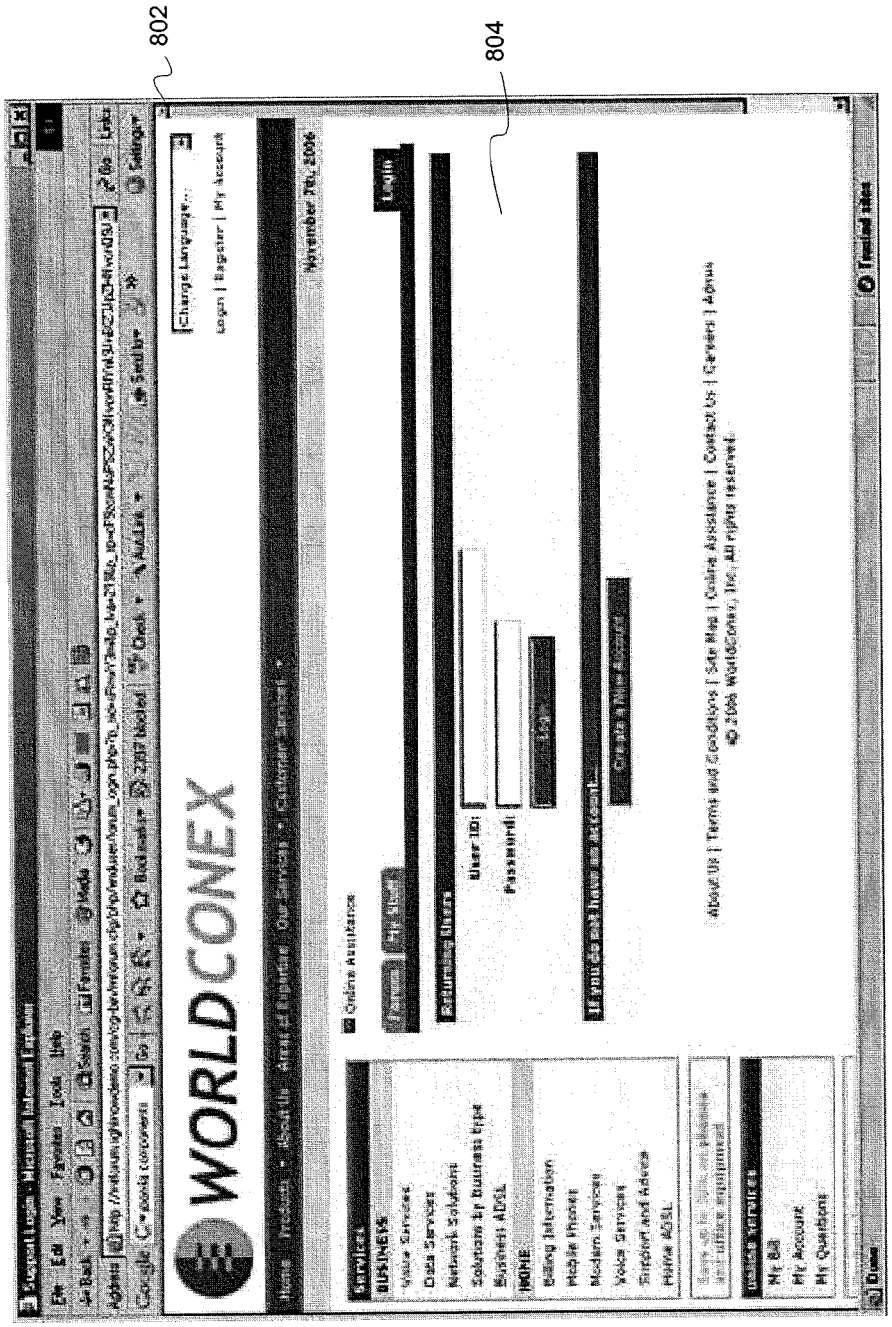

Returning to FIG. 2, at block 206, a user may optionally decide to reply to a thread item. In some embodiments, a user logs in to the system in order to identify the user and/or in order to ensure that the user is authorized to use the system. An example screen image 802 in FIG. 8 provides an example login screen. Login parameters such as a user id and password may be provided in parameter area 804.

After logging in, the user can post a reply to a thread or thread item. As noted above, the reply is a discrete piece of knowledge that is related to the thread via the threads parent id. The reply text may be entered into the knowledgebase 102. The reply then appears within the forum thread to potentially be ranked based on its learned relative importance to the threaded conversation.

Figure 9:
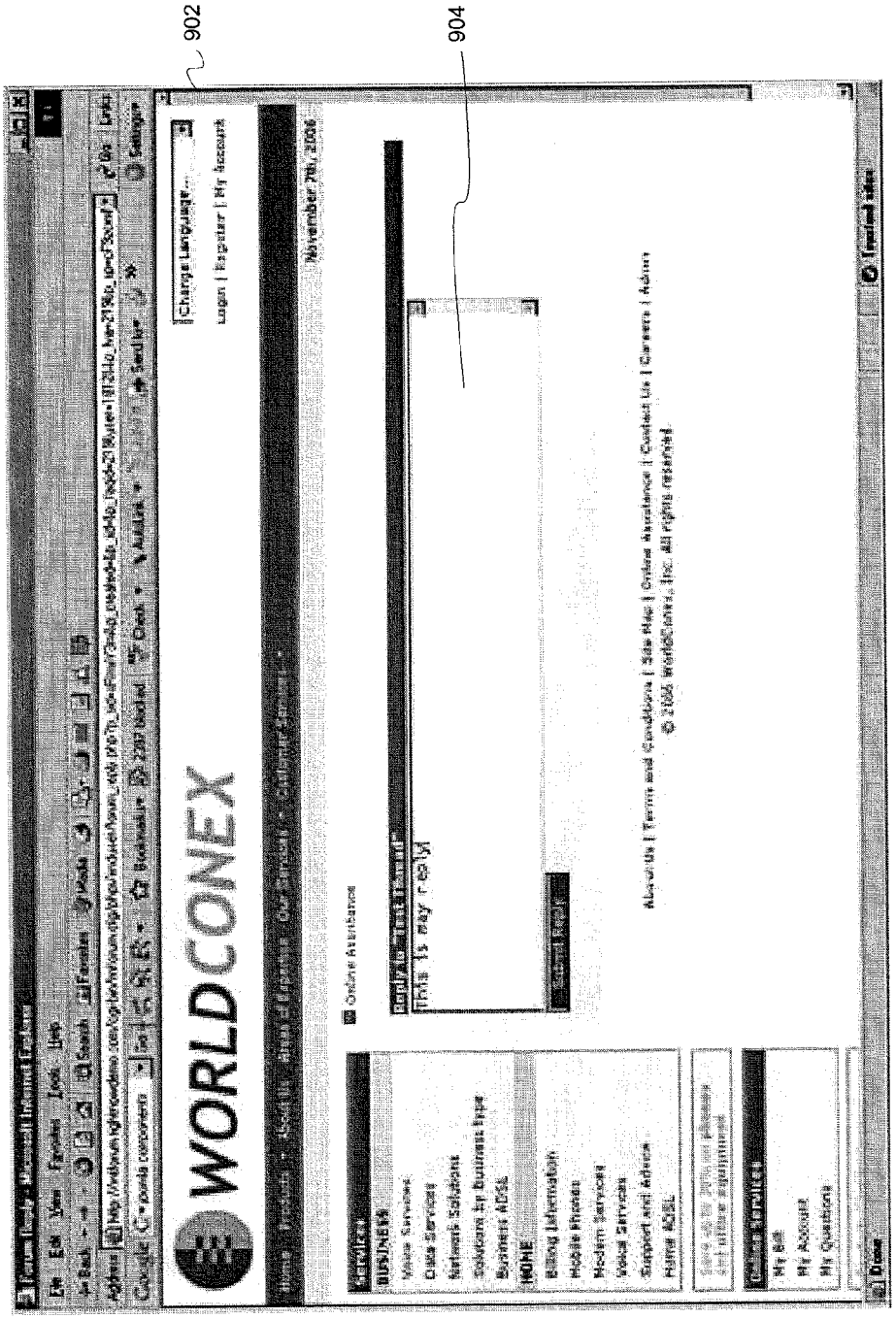

An example screen of a thread reply interface for a thread topic is provided by example screen image 902 in FIG. 9. The example screen image 902 includes area 904, which may be used to enter the text for the reply.

Figure 10:
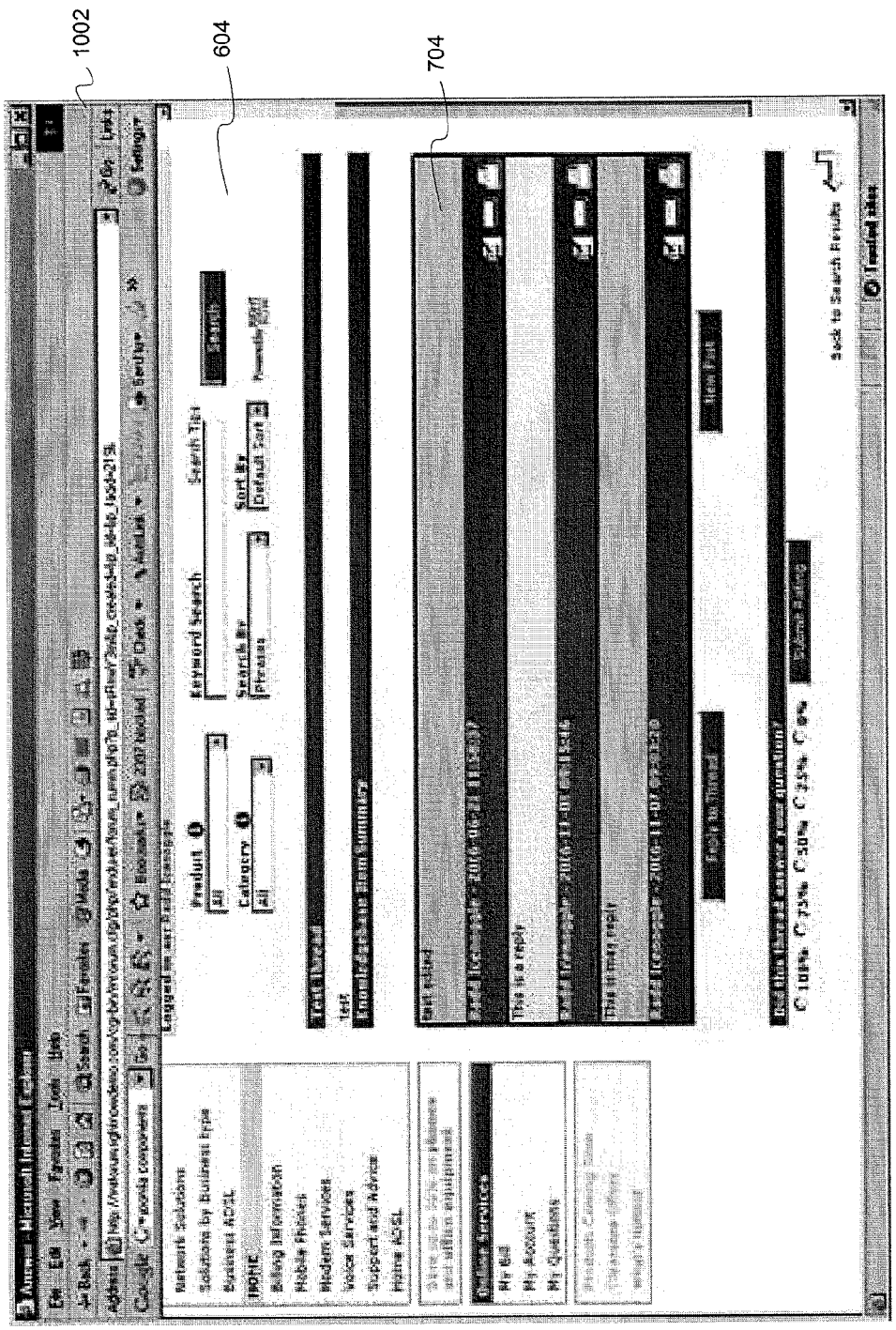

Example screen image 1002 of FIG. 10 illustrates how thread item list 704 may be updated following the entry of a reply into knowledgebase 102.

Blocks 202-206 of FIG. 2 represent one potential path a user may take through system 100. As an alternative, the user may decide that none of the current threads provided at block 202 are desired, and at block 208 may start a new thread topic using a similar process as the reply process described above at block 206. However, when starting a new thread, this first forum item is the parent and has no parent id. In some embodiments, a user must be logged in to create a new thread. In alternative embodiments, only users with a certain level of status are allowed to create a new thread.

Figure 11:
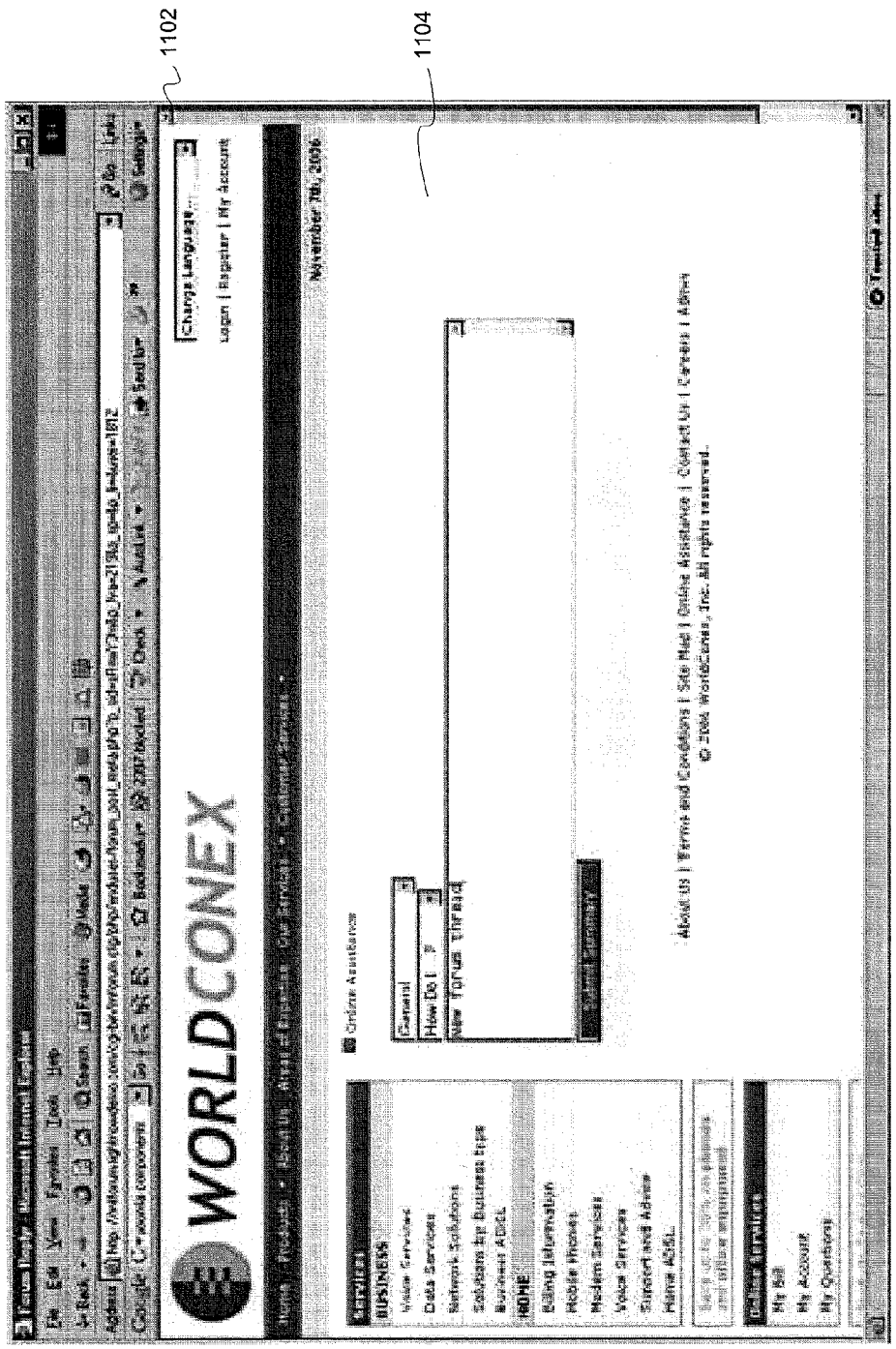

Example screen image 1102 of FIG. 11 illustrates an interface to create a new thread. Thread parameter area 1104 includes interface elements that allow a user to specify the forum that the new thread is to appear in.

Returning to FIG. 2, blocks 210 and 212 represent a method elements that may take place independently from the elements at blocks 202-206 or at blocks 202 and 208. At block 210 a system operator, administrator or knowledge engineer may use administration tool 116 to maintain knowledgebase 102. For example, the knowledge engineer may select any individual thread item in the knowledgebase and place it in other areas 212 of the knowledgebase so that the thread item is visible to other audiences. Additional administrative functions that may be performed include, but are not limited to moderation, manual re-ranking of thread topics and thread items, and creation, deletion or editing of threads or individual thread item entries.

Figure 12:
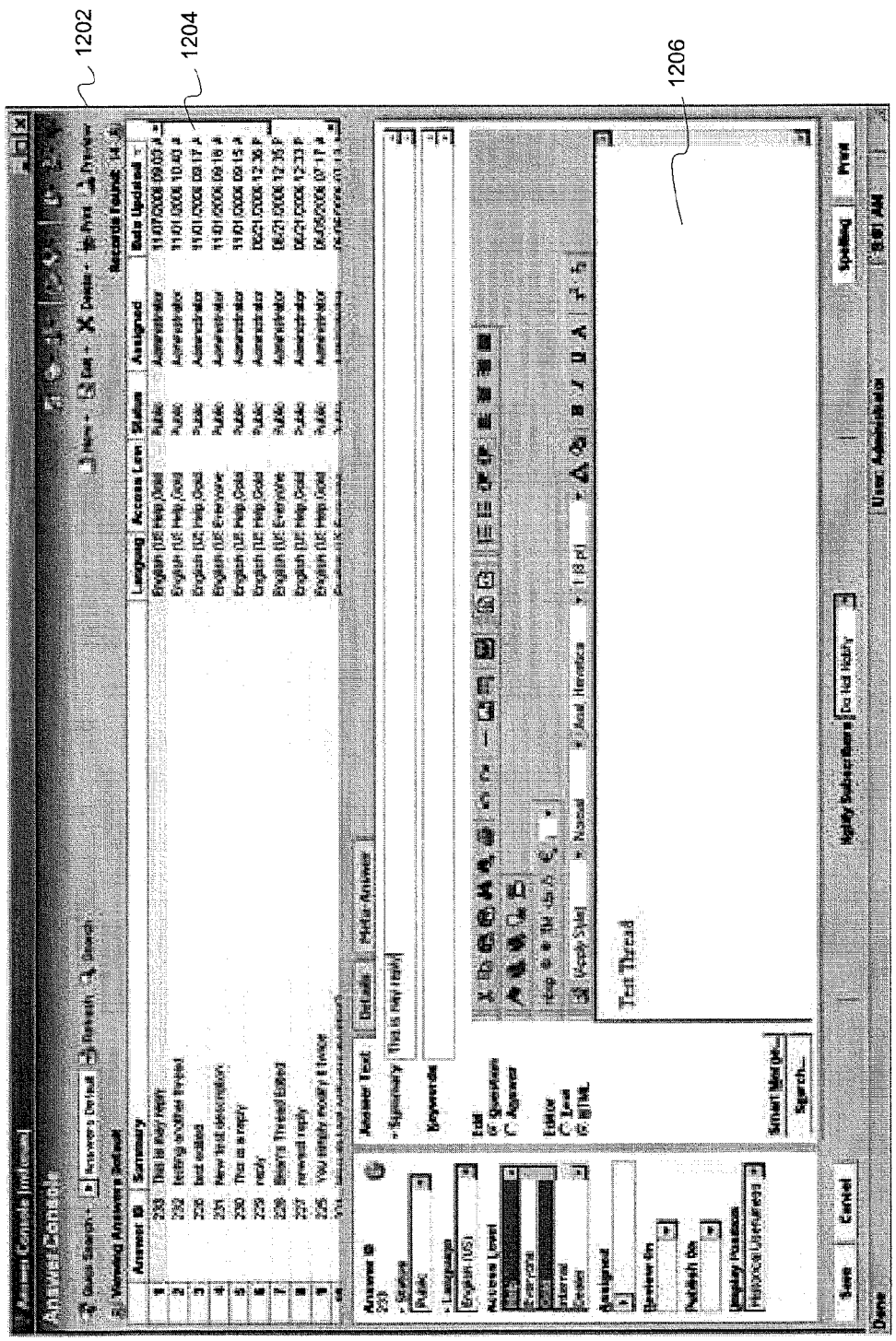

Example screen image 1202 of FIG. 12 illustrates an example interface that may be provided by administration tool 116 to maintain forums, thread topics and thread items in a knowledgebase 102. A knowledge engineer may select a thread item from selection area 1204, which provides a list of threads in the knowledgebase 102. Edit area 1206 provides editing tools and a text region in which the knowledge engineer may edit text of a selected thread item.

Figure 3:
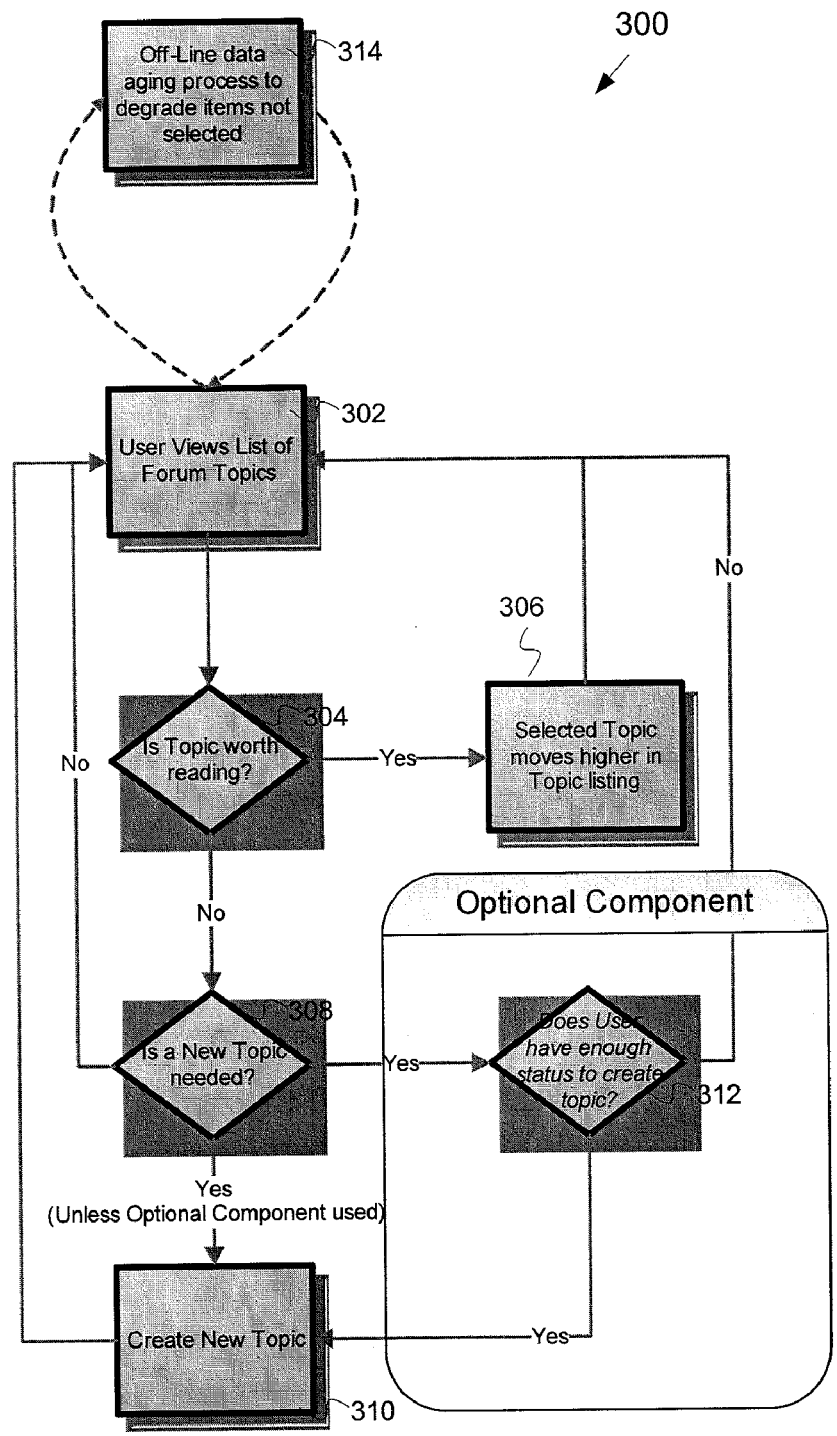
FIG. 3 is a flowchart illustrating a method for ranking forum topics according to embodiments of the invention.

FIG. 3 is a flowchart illustrating a method 300 for ranking forum topics according to embodiments of the invention. The method begins at block 302, where a user views a list of forum topics that may be presented by an information client 110 and generated by an information server 112.

At block 304, the system receives an indication of whether the user determined that the topic was worth reading. The indication that the user is interested in a topic will typically involve receiving a selection of the topic through a user interface provided by information client 110. However, other methods of expressing interest in a topic may be used and are within the scope of the inventive subject matter.

At block 306, if the user indicates the topic was worth reading, then in some embodiments, the self-learning module 114 adjusts the ranking of the topic such that the topic moves higher in the topic list.

At block 308, if the user decides that none of the current topics in the forum was worth reading, then the system determines if the user desires to create a new topic. In some embodiments, the user may create the topic at block 310 using the interfaces described above. In alternative embodiments, at block 312 the system checks to see if the user as attained enough status to create a topic before the topic is created at block 310.

Independently of the activities in blocks 302-312, in some embodiments at block 314 the system 100 performs a data aging process to determine threads that have not been selected for viewing by any users within a configured or desired period of time. The ranking of these items may be degraded or lowered such that the items appear lower in the topic list.

Figure 4:
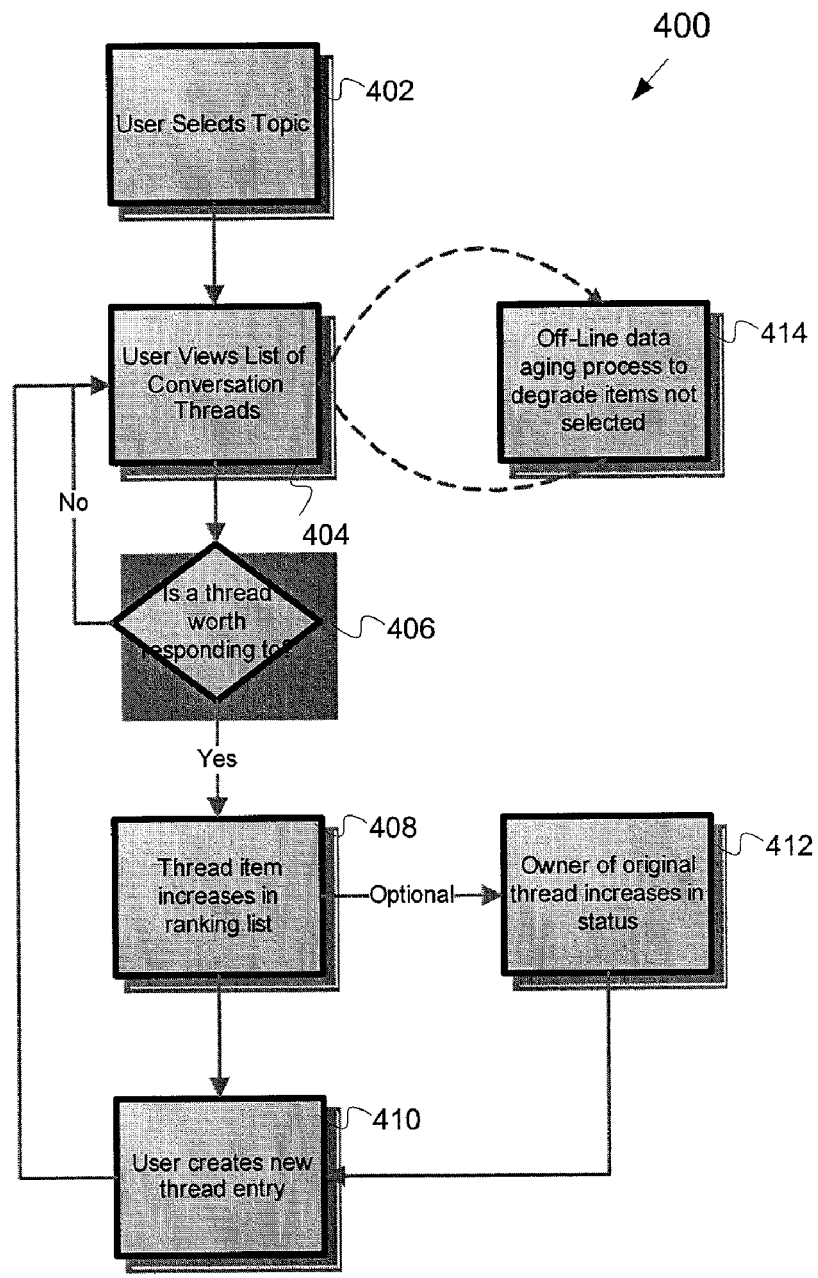
FIG. 4 is a flowchart illustrating a method for ranking conversation thread items according to embodiments of the invention.

FIG. 4 is a flowchart illustrating a method 400 for ranking thread items according to embodiments of the invention. At block 404, the system receives an indication of whether the user has selected a topic of interest. The indication that the user is interested in a topic will typically involve receiving a selection of the topic through a user interface provided by information client 110. However, other methods of expressing interest in a topic may be used and are within the scope of the inventive subject matter.

At block 404, a list of thread items for the selected topic is presented to the user. As noted above, the thread items will be ordered as determined in the knowledgebase 102.

At block 406, the system receives an indication whether the user has selected a thread item that the user wishes to reply to.

The indication that the user is interested in replying to a particular thread item will typically involve receiving a selection of the thread item through a user interface provided by information client 110. However, other methods of expressing interest in a thread item may be used and are within the scope of the inventive subject matter.

If the user indicates a particular thread item was worth replying to, then in some embodiments, at block 408 the self-learning module 114 adjusts the ranking of the thread item such that the thread item related to the reply moves higher in the list of thread items the next time the list is presented to a user. If none of the thread items was selected, the method returns to block 404 to await selection of a thread item from the list.

At block 410, if the user decides that none of the current thread items in the topic was worth replying to, then the system determines if the user desires to create a new thread entry.

In some embodiments, if a user replies to a particular thread item, a status value for the user originating the thread item is increased at block 412.

Independently of the activities in blocks 402-412, in some embodiments at block 414 the system 100 performs a data aging process to determine thread items that have not been selected for viewing by any users within a configured or desired period of time. The ranking of these thread items may be degraded or lowered such that the thread items appear lower in the list of thread items for a thread topic.

Figure 5:
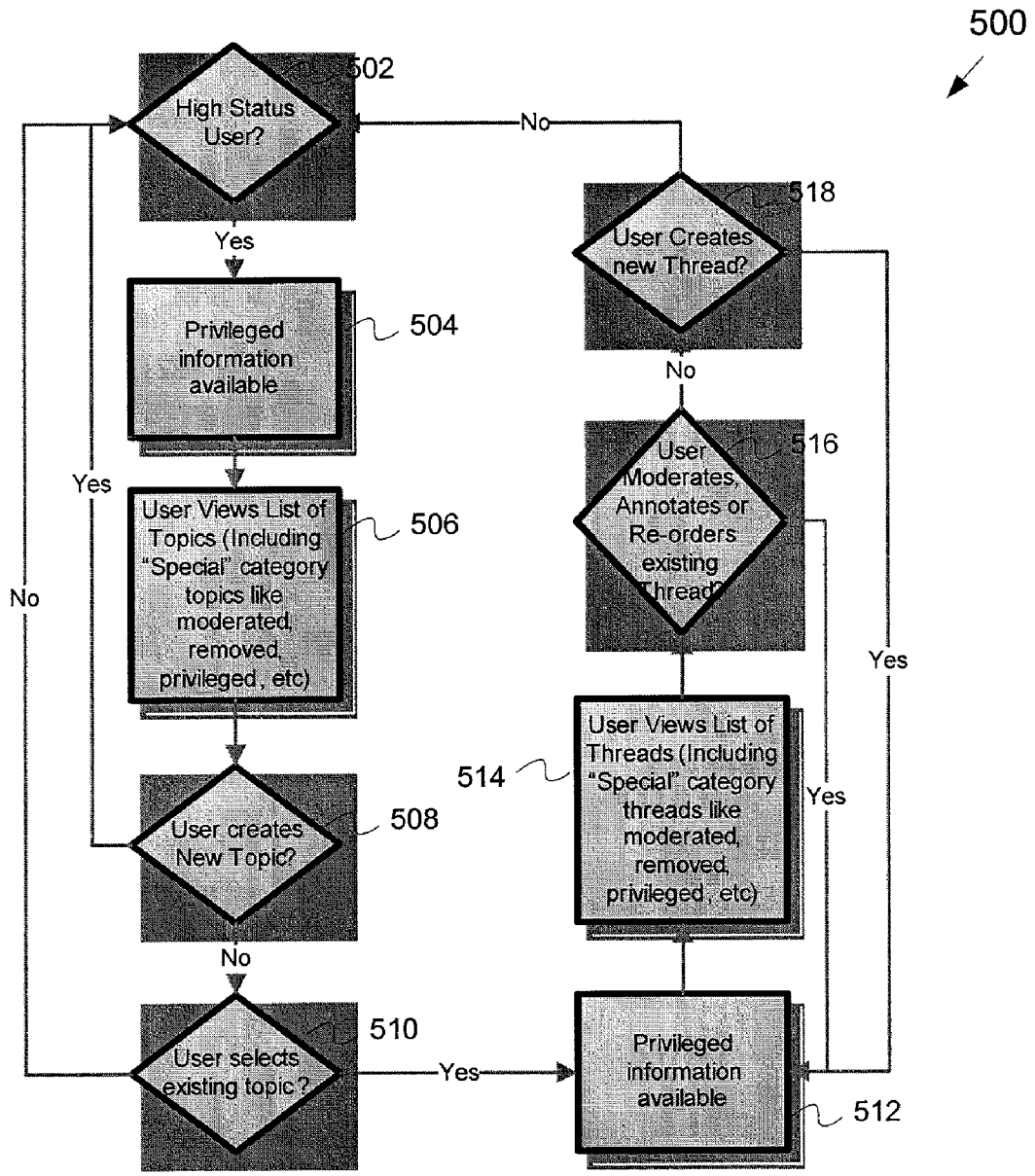
FIG. 5 is a flowchart illustrating a method for providing status-enabled privileges in a forum according to embodiments of the invention.

FIG. 5 is a flowchart illustrating a method 500 for providing status-enabled privileges in a forum according to embodiments of the invention. The method begins at block 502 by determining if the user is a high status user. That is, the system determines if the user has enough status to view additional topics or perform additional operations on topics.

At block 504 the system obtains privileged information if it is available for use by the high status user.

At block 506, the system display a list of topics, including topics that appear in a special category, where topics in the special category are only viewable if the user has sufficient status. For example, topics in the special category may be moderated topics, previously removed topics, or privileged topics only displayed to users with sufficient status.

At block 508, the system checks to see if the user desires to create a new topic. If so, the processing proceeds as indicated at block 308-312 if FIG. 3.

Otherwise, at block 510 the system determines if the user has selected an existing topic. If so, the method proceeds to block 512 to obtain any privileged information that may have been associated with the topic and that is available for users with sufficient status. For example, privileged information may include, but is not limited to, contact information of varying degrees to various qualities of users. Users having a highest status may get a direct dial phone number, whereas medium status users may receive an email address, and low status users may only receive a postal mail address. Each has a different implied and actual response rate. Further, privileged information may include thread items that have not yet been approved by a moderator. Still further, privileged information may include an access point into a separate knowledgebase that is not available to nonprivileged or lower status users.

At block 514, the system provides a list of thread items in the topic. The list may include thread items in a "special" category, such as moderated thread items, removed thread items, or privileged thread items.

At block 516, the system checks to see if the user has performed a function requiring a sufficient status, such as moderating a thread, annotating one or more thread item, or reordering the thread items in the thread. If so, the system applies the desired function, and returns to block 512 to reevaluate any privileged information that may have been received during the editing, moderating, or reordering functions.

Otherwise, at block 518 the system determines if the user desires to create a new thread. If so, the system performs the actions at block 410 (FIG. 4) and then proceeds to block 512 to reevaluate any privileged information that may have been received as part of the thread item creation.

The systems, methods and knowledgebases described above can be implemented on hardware, firmware, and/or software for performing the operations described herein. Further, the methods and knowledgebases described above may be stored on a machine readable (e.g. a computer-readable) media. Machine-readable media includes any mechanism that provides (e.g., stores and/or transmits) information in a form readable by a machine. For example, tangible machine-readable media includes read only memory (ROM), random access memory (RAM), magnetic disk storage media, optical storage media, flash memory machines, etc.

EXAMPLES

A series of examples illustrating the operation of the above-described systems and methods will now be provided. It should be noted that the embodiments are not limited to the modes of operation described below and that other modes of operation besides those detailed in the examples below are possible and within the scope of the inventive subject matter.

Example 1

In this example, a user visits a support site hoping to find information on his question about "Why won't my mouse trap catch mice?" He discovers a forum section on the support site and views the list of topics other users are conversing about. They are (numbered by position):
 1. Mouse trap safety
 2. Varieties of mice
 3. Effective mouse trap bait Assume the user selects the third topic, "Effective mouse trap bait." After perusing the content, the user returns to the original list of topics to find the following ranking:
 1. Mouse trap safety
 2. Effective mouse trap bait
 3. Varieties of mice Example 2

Phase 1:

Assume a user visits a support site hoping to find information on his question about "Why won't my mouse trap catch mice?" The user discovers a forum section on the support site and views the list of topics other users are conversing about. The user chooses a topic titled, "Effective mouse trap bait." In this topic are the following conversation entries (numbered by position):
 1. I have the model XYZ mouse trap and it operates correctly, but no mice seem interested. What do others use for bait?
 2. I use peanut butter with a lot of success.
 3. [RE: peanut butter] Me too
 4. I use cheese.

Phase 2:

Assume the user selects the fourth item and responds: "[RE: cheese] What kind of cheese works best?" This causes the list to re-rank in the following order:
1. I have the model XYZ mouse trap and it operates correctly, but no mice seem interested. What do others use for bait?
2. I use peanut butter with a lot of success.
3. I use cheese.
4. [RE: cheese] What kind of cheese works best?
5. [RE: peanut butter] Me too Phase 3:

Eventually, after many others have used the forums, the user returns to find the following conversation entries:
1. I have the model XYZ mouse trap and it operates correctly, but no mice seem interested. What do others use for bait?
2. [RE: cheese] What kind of cheese works best?
3. [RE: cheese types] Success rate of cheeses in my trap: American, 5 mice; Bleu, 0 mice; Brie, 2 mice; Swiss, 17 mice; Wensleydale, 3 mice. I recommend using Swiss.
4. [RE: cheese types] American cheese seemed to work in my trap.
5. I use cheese.
6. I use peanut butter with a lot of success.
7. [RE: peanut butter] Natural, chunky-style worked best for me.
8. [RE: peanut butter] Me too
9. [RE: American cheese] Mine too The user (as well as new visitors) can quickly scan to find the third item containing the most relevant information, while those items that are less helpful are ranked at the end of the list.

Phase 4:

Eventually those items that no one finds useful may be aged to the point where they don't display, creating the following (automatically shortened) list:
1. I have the model XYZ mouse trap and it operates correctly, but no mice seem interested. What do others use for bait?
2. [RE: cheese] What kind of cheese works best?
3. [RE: cheese types] Success rate of cheeses in my trap: American, 5 mice; Bleu, 0 mice; Brie, 2 mice; Swiss, 17 mice; Wensleydale, 3 mice. I recommend using Swiss.
4. I use peanut butter with a lot of success.
5. [RE: peanut butter] Natural, chunky-style worked best for me.

Example 3

Assume a user visits a support site hoping to find information on the question about "Why won't my mouse trap catch mice?" The user discovers a forum section on the support site and views the list of topics other users are conversing about. They are (numbered by position):
1. Mouse trap safety
2. Varieties of mice
3. Effective mouse trap bait The user decides to create a new topic, "Mouse trap malfunctions" but the system responds with, "Sorry, but you have not acquired enough status to create a new discussion." The user then decides to read the third topic, "Effective mouse trap bait." At this point, the operation of the system proceeds as in Example 2, Phase 1 and Phase 2.

By Phase 3 of Example 2 assume that there has been various indications about the user's status, for example, posting a provocative entry that prompted multiple responses and moving up the list of important entries to second. By Phase 4 this status is further reinforced, leaving the user with a sufficient level of status to perform operations reserved for user's having enough status. Now, should the user visit the site and decide to create a new topic, the system will permit him to do so because of the user's prior positive contributions.

Example 4

Similar to Example 3, once the user has gained an appropriate level of status there could be additional system features available to the user besides the ability to create new discussion topics. For example, the user may now have access to one or more of the following features:
1. Moderating: the user may have the permission to remove contributions of others.
2. System control: the user may be able to directly re-rank topics or topic threads.
3. Visibility: the user may have extended visibility of content, including:
   Those contributions that have not yet passed, or potentially been removed by a moderator.
   Additional embedded content within a contribution flagged for high status individuals (ex: a contribution may be "[RE: cheese types] Success rate of cheeses in my trap: American, 5 mice; Bleu, 0 mice; Brie, 2 mice; Swiss, 17 mice; Wensleydale, 3 mice. I recommend using Swiss. <begin-high-status-only>If you contact me at 555-1212 I can give you the full spreadsheet breakdown of my 3 month study and more reasons why I find Swiss superior.<end-high-status-only>").
   Other information sources: the user may now see an access point into a company sponsored knowledgebase normally accessible to high status contributors and corporate partners.

The lists above are not intended to be exhaustive, and those of skill in the art will appreciate that other uses of status levels are within the scope of the inventive subject matter.

The various examples shown above are used to illustrate a novel self-learning system for ranking thread topics and thread items within a thread topic. It should be noted that the embodiments are not limited to the examples above and that various forms of the inventive subject matter could be utilized without departing from the scope of the inventive subject matter.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A computer implemented system comprising:
a knowledgebase operable to maintain one or more forums, the one or more forums having forum components;

an information server coupled to the knowledgebase and operable to receive a request related to the one or more forums and operable to provide an ordered list of the forum components; and a self-learning module operable to modify one or more values maintained in the knowledgebase, the one or more values usable to determine an order of the forum components in the ordered list, the modification based on the request received by the information server.

2. The system of claim 1, wherein the forum components comprise thread topics.

3. The system of claim 2, wherein the request comprises a request to view a thread topic, and wherein the self learning module modifies the one or more values such that the thread topic appears higher in the ordered list of thread topics.

4. The system of claim 1, wherein the forum components comprise thread items for a thread topic.

5. The system of claim 4, wherein the request comprises a request to view a thread item, and wherein the self learning module modifies the one or more values such that the thread item appears higher in the ordered list of thread items.

6. The system of claim 1, further comprising an administrative tool operable to provide a user interface for modifying the one or more values.

7. The system of claim 6, wherein the administrative tool is further operable to provide a user interface to move a forum item from a first forum topic to a second forum topic.

8. A method comprising: maintaining a knowledgebase operable to maintain one or more forums, the one or more forums having forum components;

providing an ordered list of the forum components;

receiving a request related to a forum component in the ordered list; and modifying, using a self-learning module, one or more values maintained in the knowledgebase, the one or more values usable to determine an order of the forum components in the ordered list, the modification based on the request received by an information server.

9. The method of claim 8, wherein the forum components comprise thread topics.

10. The method of claim 9, wherein the request comprises a request to view a thread topic, and wherein modifying the one or more values includes modifying the one or more values such that the thread topic appears higher in the ordered list of thread topics.

11. The method of claim 8, wherein the forum components comprise thread items for a thread topic.

12. The method of claim 11, wherein the request comprises a request to view a thread item, and wherein modifying the one or more values includes modifying the one or more values such that the thread item appears higher in the ordered list of thread items.

13. The method of claim 11, wherein the request comprises a request to post a response to a thread item.

14. The method of claim 13, wherein modifying the one or more values includes modifying the one or more values such that the thread item appears higher in the ordered list of thread items.

15. The method of claim 11, further comprising modifying a status value associated with an originator of the thread item upon determining the thread item has been viewed or responded to.

16. The method of claim 13, further comprising determining if a status value for a user issuing the request to post the response is sufficient to allow the request.

17. The method of claim 8, further comprising modifying the one or more values such that a forum component that has not been selected for a predetermined period of time appears lower in the ordered list.

18. A non-transitory machine-readable medium having data stored thereon, the data forming a knowledgebase, the knowledgebase comprising:

one or more thread topics, each of the thread topics having one or more values usable to determine a topic order;

one or more thread items, each of the thread items having one or more values usable to determine a thread item order; and wherein during a computerized data processing operation, a self-learning module modifies the one or more values usable to determine a thread item order or the one or more values usable to determine a thread item order in response to a request related to a thread topic or a thread item.

19. The non-transitory machine readable medium of claim 18, wherein during a computerized data processing operation the self-learning module modifies the one or more values usable to determine a thread item order or the one or more values usable to determine a thread item order upon determining that the thread topic or thread item has not been requested for a predetermined amount of time.

20. A non-transitory machine-readable medium having machine executable instructions for causing one or more processors to perform a method, the method comprising:

maintaining a knowledgebase operable to maintain one or more forums, the one or more forums having forum components;

providing an ordered list of the forum components;

receiving a request related to a forum component in the ordered list; and modifying, using a self-learning module, one or more values maintained in the knowledgebase, the one or more values usable to determine an order of the forum components in the ordered list, the modification based on the request received by the information server.

* * * * *